March 4, 1958 — J. SKVIER — 2,825,175
AUTOMATIC CASTING FLOAT
Filed Sept. 13, 1957
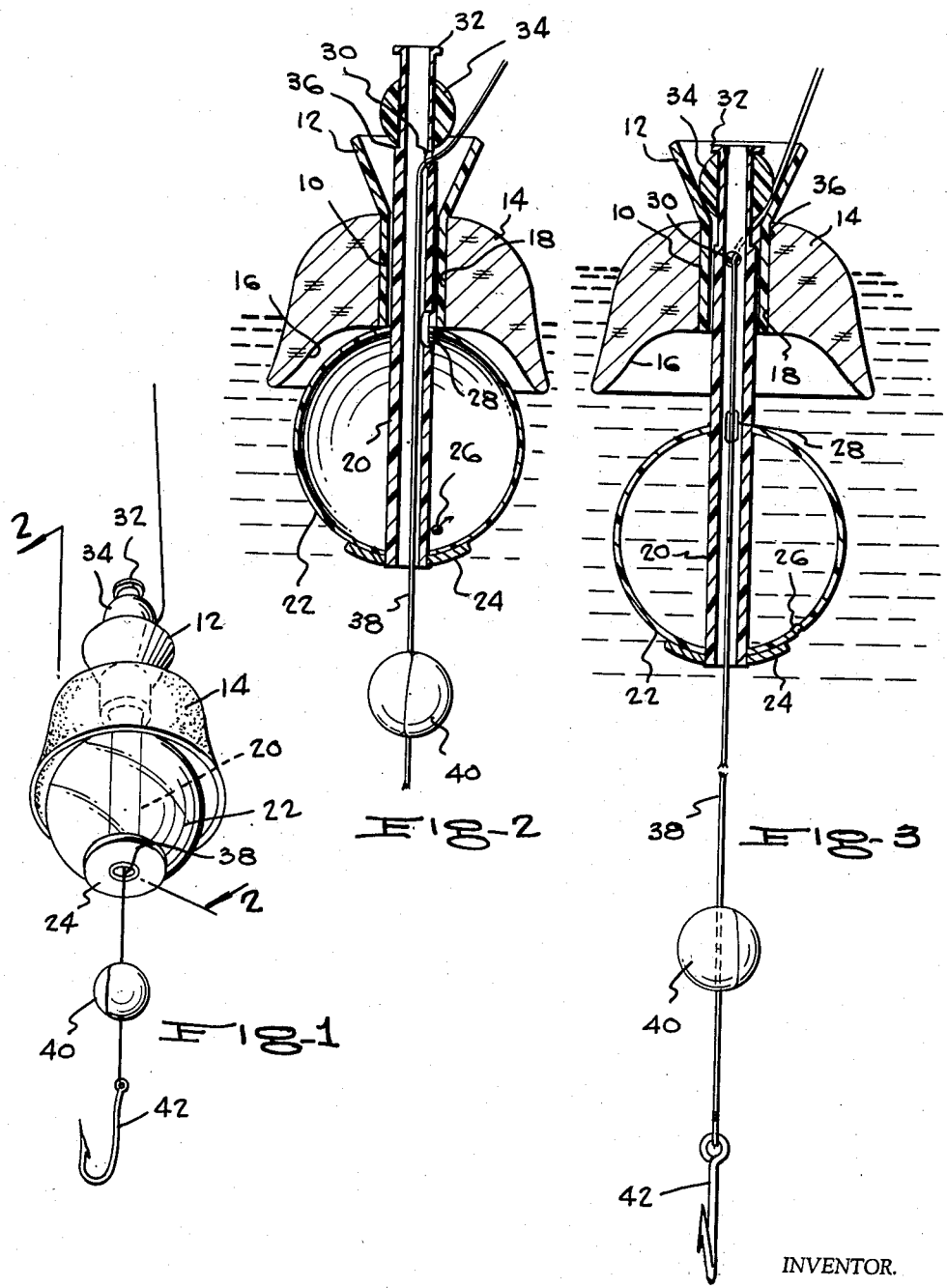
INVENTOR.
JOHN SKVIER
BY
McMorrow, Berman & Davidson
ATTORNEYS

United States Patent Office 2,825,175
Patented Mar. 4, 1958

2,825,175

AUTOMATIC CASTING FLOAT

John Skvier, Zeigler, Ill.

Application September 13, 1957, Serial No. 683,906

7 Claims. (Cl. 43—44.91)

This invention relates to fishing floats, and more particularly has reference to an automatic casting float.

When one is fishing by casting, and desires to use a float, certain difficulties have heretofore been experienced, if it is desired that the bait be submerged at a particular, substantial depth, as for example near the bottom of the body of water.

These difficulties derive from the fact that if the bait is to be used near the bottom, obviously it must be at some distance from the float, assuming of course that the body of water is of a rather substantial depth. This, in turn, makes casting difficult, since the float is at a corresponding, substantial distance away from the baited hook, along the fishing line. Obviously, this prevents accurate casting, since in casting operations the objects to be carried into the water, that is, the float and the baited hook should be disposed as near as posible to the end of the line to permit casting to the maximum distance, and with the maximum facility, and with minimum possibility of entanglement of the line.

Obviously, to merely locate the float near the baited hook, before casting, does not solve the problem, in view of the fact that the baited hook will then be so close to the float as to be near the surface of the body of water, thereby preventing the user from fishing at the desired depth.

The main object of the present invention is to eliminate the difficulties noted above, and to this end, I have devised a casting float that will be disposed in very close proximity to the sinker and the hook, when being cast, but will nevertheless, as soon as the sinker, hook, and float strike the water, operate in a manner to permit the line to run through the float for a predetermined length of time, with the float thus being shifted a substantial distance along the line from the baited hook. The hook may thus travel to or near the bottom, the float being designed to grip the line after this stage of the operation, to maintain the hook at the desired depth.

A more particular object of the invention is to provide a delayed gripping action of the character described above, which will be such that a downward pull upon the hook, such as that which would be exerted by a fish taking the bait, will submerge the float to indicate that a fish has seized the bait, with said action nevertheless being such that a few short upward pulls will raise the bait a desired distance off of the bottom of the lake, after the above described gripping action has initially taken place.

Another object is to provide a casting float which will have the characteristics set forth above, but which will be so designed that in retrieving the float and bait, said bait and the sinker adjacent the same will be pulled up toward the float as the line is reeled in.

Still another object is to so design the float that various components of the float can be interchangeably, selectively related in such a manner as to change the balance of the float, to such extent as may be desired.

A further object is to include in the float a hollow sphere adapted to fill with water, to effect the delayed gripping action referred to above, with said filling taking place through an aperture, the size of which will determine the amount of time during which the sinker is permitted to carry the bait toward the bottom of the body of water. Thus, by selecting a sphere of particular size in relation to the opening therein, said amount of time can be predetermined by the user.

Other objects will appear from the following description, the claims appended thereto, and from the annexed drawing, in which like reference characters designate like parts throughout the several views, and wherein:

Figure 1 is a perspective view of an automatic casting float according to the present invention, as seen from below;

Figure 2 is an enlarged longitudinal sectional view there through on line 2—2 of Figure 1 in which the parts are illustrated as they appear immediately after the float drops into the water following casting thereof; and Figure 3 is a view like Figure 2, with parts appearing in the positions assumed thereby when the bulb element has filled with water, to prevent further movement of the line downwardly within the float, a portion of the line being broken away.

Referring to the drawing in detail, designated at 10 is a sleeve, which may be formed of plastic material as shown, although of course this particular material is not necessarily required for successful operation of the invention.

Sleeve 10 includes, at its upper end, an upwardly flaring or frustoconical, belled portion 12.

Sleeve 10 is fixedly engaged with an upper float element 14 which in all stages of the operation remains buoyant in the water, and which thus, as shown, can be formed as a solid cork body. The upper float element 14, in a preferred construction illustrated, has a rounded top part and downwardly flaring lower part, the underside of which has a concavity or downwardly opening recess 16 communicating with an axial bore 18 of the float element in which sleeve 10 is fixedly engaged.

Freely, axially shiftable within sleeve 10 is an elongated, tubular stem 20 having an axial bore opening upon opposite ends of the stem. Stem 20 is loosely positioned through the sleeve 10, and extends downwardly below the upper float element a substantial distance. The lower end portion of stem 20 extends axially within and is fixedly secured to a thin-walled, globular shell or lower float element 22, preferably formed of a transparent plastic material. A circular, concavo-convex retainer 24 underlies the shell, and has a center opening receiving the lower extremity of the stem 20, said retainer being fixedly engaged with the stem. This retainer is also a weight which helps to hold the float upright and furnishes the necessary downward pull, when float 22 sinks, to operate a gripping device composed of belled end 12 and a head 34.

Formed in the lower portion of the shell 22, adjacent the periphery of the retainer 24, is a small opening or port 26, through which water may enter the shell. Also communicating with the interior of the shell is a slot-like opening 28 extending longitudinally of stem 20. For the lower half of the length of the opening 28 said opening 28 communicates with the interior of the shell, providing communication between the shell and the interior of the stem 20. The upper half of the opening 28, communicates between the stem 20 and the space surrounding the stem 20 within the sleeve 10, in the position of parts immediately following dropping of the float into the water (see Figure 2).

Spaced longitudinally of stem 20 from the opening 28, at a location between the opening 28 and the upper end of the stem, is a relatively small opening 30. The upper end of the stem has an outwardly directed collar 32 formed with an abutment limiting upward movement of a spherical enlargement or head 34, having an axial bore receiving the upper end portion of the stem. Below the enlargement 34, there is provided a relatively narrow, circumferential shoulder 36 forming an abutment limiting downward movement of the enlargement 34 upon the stem.

Designated at 38 is a fishing line, and below the lower end of the stem, said line carries a sinker 40, disposed immediately adjacent or in any other selected proximity to a hook 42. The line 38, as clearly shown in Figures 2 and 3, extends upwardly through the lower end of the stem, and extending within the stem is positioned through the opening 30, so as to be disposed between the head 34 and the wall of the belled upper end 12 of sleeve 10.

Considering now, the use of the device, initially, the shell 22 will be free of water, as shown in Figure 2, and casting float will be moved along the line 38 so as to be disposed in close proximity to the sinker 40. Thus, the float, sinker, and hook will all be disposed at the end of the line, so as to facilitate casting.

When the device is cast, and drops into the water, it will initially appear as in Figure 2. The float of course will pull the device to an upright position, and since shell 22 is rigid with the stem 20, and is filled with air at this particular stage of the operation, the shell will urge the stem upwardly within the buoyant body of the upper float element 14. Therefore, the enlargement 34 will be elevated so as to be disposed almost entirely out of the belled end 12, freeing the line 38 for running movement through the opening 30 and stem 20 under the pull of the sinker.

Therefore, the sinker will travel toward the bottom pulling the line downwardly, and this downward movement of the sinker is permitted as long as the lower float element 22 is buoyant enough to remain in contact with the underside of the upper float element as in Figure 2. Eventually, the shell or lower float element 22 will fill with water as in Figure 3, and then will no longer be buoyant in water, so as to now drop to the Figure 3 position. This brings the surface of the head 34 into contact with the wall of the belled portion 12, causing the line 33 to be clampably engaged between the head 34 and said belled end 12 as shown in Figure 3. This prevents further downward movement of the sinker, and the user is immediately given visual indication of the position of the parts, by reason of the fact that the enlargement drops down into the belled end 12, and the line stops running through the stem.

Therefore, if one desires to raise the bait to a selected extent off the bottom of the lake or other body of water, a few short pulls will suffice for this purpose. In other words, the gripping action is such that the line can be pulled up through the stem 20, but a pull downwardly upon the hook 42 will submerge the upper float element 14, indicating that a fish has taken the bait.

In retrieving, the bait and the sinker are pulled up toward the float as one reels in the line. Subsequently, time should be permitted for the water to drain from the lower float element before the device is cast once again.

It will be seen that the gripping action on the line 38 is timed, according to the length of time it takes for the bottom float element to fill with water to an extent that will cause it to drop from its Figure 2 and its Figure 3 position. In this connection, one can vary the timing, by selecting a lower float element having a particular size of opening 26. The larger the opening 26 in relation to the cubic area of shell 22, the sooner the shell will fill.

With respect to the upper float element 14, it will be noted that by reason of the concavity 16, air will be trapped when the upper float drops into the water. This helps clear the stem 20 of water, so that the line will move freely through the stem and so that air escaping from the lower float element can pass freely through the stem 20. Further, the line, passing through the stem, also helps to break up any bubbles that would tend to hinder the air from escaping through the stem.

It will be noted that the particular formation and location of the slot-like opening 28 is such that the opening permits the air to escape from the lower float element 22 through the tubular stem and at the same time aids in permitting escape of the air trapped in the concavity 16, this air also escaping through the stem 20.

It will be noted that initially the upper float element 14 rises rather high in the water. However, when the lower float element fills with water, one is provided a visual indication that the sinker has carried the bait to the bottom, due to the fact that the upper float element will now sink deeper in he water due to the loss of buoyancy of the lower float element. Further, as one pulls the sinker upwardly from the bottom, the top float tends to sink even more. One can, therefore paint rings of different colors upon the upper float element, so to permit one to observe immediately the various stages of operation of the device.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles, it being considered that the invention comprehends any minor change in construction that may be permitted within the scope of the appended claims.

What is claimed is:

1. An automatic casting float comprising an elongated, tubular stem open at its lower end and having a head on the upper end portion and also a side opening, for extension of a line through the side opening and within the stem in position passing out of the open lower end of the stem; upper float means freely slidable upon the stem and including an upwardly opening, flared portion in which said head engages on downward movement of the stem in respect to said float means, said side opening being disposed below the head, for clamping of the fishing line between the head and flared portion; and a lower float means having inlet and outlet openings, said lower float means being fixed to the stem below the upper float means, for passage of water into the inlet simultaneously with the escape of air from the lower float means from the outlet opening thereof, thus to cause downward movement of the stem to a position in which the head will cooperate with the flared portion in clamping a line, following filling of the lower float means with water, said head being disposed out of contact with the flared portion when the lower float means is buoyant and is in position elevating the stem within the upper float means.

2. An automatic casting float comprising an elongated, tubular stem open at its lower end and having a head on the upper end portion and also a side opening, for extension of a line through the side opening and within the stem in position passing out of the open lower end of the stem; upper float means freely slidable upon the stem and including an upwardly opening, flared portion in which said head engages on downward movement of the stem in respect to said float means, said side opening being disposed below the head, for clamping of the fishing line between the head and flared portion; and a lower float means having inlet and outlet openings, said lower float means being fixed to the stem below the upper float means, for passage of water into the inlet simultaneously with the escape of air from the lower float means from the outlet opening thereof, thus to cause downward movement of the stem to a position in which the head will cooperate with the flared portion in clamping a line, following filling of the lower float means with water, said head being disposed out of contact with the flared portion when the lower float means is buoyant and is in position elevating the stem within the upper float means, said upper float means including a buoyant float element having an axial bore, a sleeve engaged in said bore, said stem being loosely positioned through the sleeve and a belled, upwardly projecting upper end on the sleeve constituting said flared portion of the upper float means.

3. An automatic casting float comprising an elongated, tubular stem open at its lower end and having a head on the upper end portion and also a side opening, for extension of a line through the side opening and within the stem in position passing out of the open lower end of the stem; upper float means freely slidable upon the stem and including an upwardly opening, flared portion in which said head engages on downward movement of the stem in respect to said float means, said side opening being disposed below the head, for clamping of the fishing line between the head and flared portion; and a lower float means having inlet and outlet openings, said lower float means being fixed to the stem below the upper float means, for passage of water into the inlet simultaneously with the escape of air from the lower float means from the outlet opening thereof, thus to cause downward movement of the stem to a position in which the head will cooperate with the flared portion in clamping a line, following filling of the lower float means with water, said head being disposed out of contact with the flared portion when the lower float means is buoyant and is in position elevating the stem within the upper float means, said upper float means including a buoyant float element having an axial bore, a sleeve engaged in said bore, said stem being loosely positioned through the sleeve and a belled, upwardly projecting upper end on the sleeve constituting said flared portion of the upper float means, said float element having a downwardly opening concavity, in which air is adapted to be trapped on movement of the float element into the water, said sleeve loosely receiving the stem so as to permit escape of the trapped air upwardly through the sleeve exteriorly of the stem.

4. An automatic casting float comprising an elongated, tubular stem open at its lower end and having a head on the upper end portion and also a side opening, for extension of a line through the side opening and within the stem in position passing out of the open lower end of the stem; upper float means freely slidable upon the stem and including an upwardly opening, flared portion in which said head engages on downward movement of the stem in respect to said float means, said side opening being disposed below the head, for clamping of the fishing line between the head and flared portion; and a lower float means having inlet and outlet openings said lower float means being fixed to the stem below the upper float means, for passage of water into the inlet simultaneously with the escape of air from the lower float means from the outlet opening thereof, thus to cause downward movement of the stem to a position in which the head will cooperate with the flared portion in clamping a line, following filling of the lower float means with water, said head being disposed out of contact with the flared portion when the lower float means is buoyant and is in position elevating the stem within the upper float means, said upper float means including a buoyant float element having an axial bore, a sleeve engaged in said bore, said stem being loosely positioned through the sleeve and a belled, upwardly projecting upper end on the sleeve constituting said flared portion of the upper float means, said float element having a downwardly opening concavity, in which air is adapted to be trapped on movement of the float element into the water, said sleeve loosely receiving the stem so as to permit escape of the trapped air upwardly through the sleeve exteriorly of the stem, said stem having an elongated air escape opening communicating for a part of its length between the interior of the stem and said lower float means, and communicating for the remaining part of its length between the interior of the stem and the space surrounding the stem, said elongated opening of the stem being extended for part of least of its length into the concavity in the elevated position of the stem, to permit the simultaneous escape of air from the lower float means and from the concavity.

5. An automatic casting float comprising an elongated, tubular stem open at its lower end and having a head on the upper end portion and also a side opening, for extension of a line through the side opening and within the stem in position passing out of the open lower end of the stem; upper float means freely slidable upon the stem and including an upwardly opening, flared portion in which said head engages on downward movement of the stem in respect to said float means, said side opening being disposed below the head, for clamping of the fishing line between the head and flared portion; and a lower float means having inlet and outlet openings, said lower float means being fixed to the stem below the upper float means, for passage of water in to the inlet simultaneously with the escape of air from the lower float means from the outlet opening thereof, thus to cause downward movement of the stem to a position in which the head will cooperate with the flared port in clamping a line, following filling of the lower float means with water, said head being disposed out of contact with the flared portion when the lower float means is buoyant and is in position elevating the stem within the upper float means, said lower float means comprising a hollow, spherical shell.

6. An automatic casting float comprising an elongated, tubular stem open at its lower end and having a head on the upper end portion and also a side opening, for extension of a line through the side opening and within the stem in position passing out of the open lower end of the stem; upper float means freely slidable upon the stem and including an upwardly opening, flared portion in which said head engages on downward movement of the stem in respect to said float means, said side opening being disposed below the head, for clamping of the fishing line between the head and flared portion; and a lower float means having inlet and outlet openings, said lower float means being fixed to the stem below the upper float means, for passage of water into the inlet simultaneously with the escape of air from the lower float means from the outlet opening thereof, thus to cause downward movement of the stem to a position in which the head will cooperate with the flared portion in clamping a line, following filling of the lower float means with water, said head being disposed out of contact with the flared portion when the lower float means is buoyant and is in position elevating the stem within the upper float means, said lower float means comprising a hollow, spherical shell, said stem extending axially within the shell.

7. An automatic casting float comprising an elongated, tubular stem open at its lower end and having a head on the upper end portion and also a side opening, for extension of a line through the side opening and within the stem in position passing out of the open lower end of the stem; upper float means freely slidable upon the stem and including an upwardly opening, flared portion in which said head engages on downward movement of the stem in respect to said float means, said side opening being disposed below the head, for clamping on the fishing line between the head and flared portion; and a lower float means having inlet and outlet openings, said lower float means being fixed to the stem below the upper float means, for passage of water into the inlet simultaneously with the escape of air from the lower float means from the outlet opening thereof, thus to cause downward movement of the stem to a position in which the head will cooperate with the flared portion in clamping a line, following filling of the lower float means with water, said head being disposed out of contact with the flared portion when the lower float means is buoyant and is in position elevating the stem within the upper float means, said lower float means comprising a hollow, spherical shell, said stem extending axially within the shell, said shell being of a transparent material.

References Cited in the file of this patent

UNITED STATES PATENTS

| | | |
|---|---|---|
| 2,498,815 | McVay | Feb. 28, 1950 |
| 2,694,878 | Martens | Nov. 23, 1954 |
| 2,726,476 | Coughlin | Dec. 13, 1955 |